United States Patent
Werz et al.

(10) Patent No.: US 10,279,422 B2
(45) Date of Patent: May 7, 2019

(54) FRICTION STIR WELDING TOOL AND FRICTION STIR WELDING METHOD

(71) Applicant: UNIVERSITAET STUTTGART, Stuttgart (DE)

(72) Inventors: Martin Werz, Dettingen (DE); Michael Seidenfuss, Notzingen (DE)

(73) Assignee: UNIVERSITAET STUTTGART (DE)

( * ) Notice: Subject to any disclaimer, the term of this patent is extended or adjusted under 35 U.S.C. 154(b) by 0 days.

(21) Appl. No.: 15/521,584

(22) PCT Filed: Oct. 19, 2015

(86) PCT No.: PCT/EP2015/074098
§ 371 (c)(1),
(2) Date: Apr. 24, 2017

(87) PCT Pub. No.: WO2016/062648
PCT Pub. Date: Apr. 28, 2016

(65) Prior Publication Data
US 2017/0312850 A1    Nov. 2, 2017

(30) Foreign Application Priority Data
Oct. 24, 2014   (DE) .................... 10 2014 115 535

(51) Int. Cl.
*B23K 20/12*    (2006.01)

(52) U.S. Cl.
CPC ........ *B23K 20/1255* (2013.01); *B23K 20/128* (2013.01)

(58) Field of Classification Search
CPC ..................... B23K 20/122–20/128
USPC .............................. 228/112.1, 2.1
See application file for complete search history.

(56) References Cited

U.S. PATENT DOCUMENTS

| | | | |
|---|---|---|---|
| 5,825,655 A | 10/1998 | Nakagawa et al. ...... 364/474.17 |
| 6,264,088 B1* | 7/2001 | Larsson .............. B23K 20/1245 228/112.1 |
| 6,543,671 B2 | 4/2003 | Hatten et al. ............... 228/112.1 |
| 7,568,608 B1* | 8/2009 | Ding ....................... B23K 20/10 228/1.1 |
| 2003/0205565 A1* | 11/2003 | Nelson ................ B29C 65/0672 219/148 |
| 2004/0079454 A1* | 4/2004 | Babel ..................... B21D 22/14 148/527 |
| 2005/0045695 A1 | 3/2005 | Subramanian et al. ... 228/112.1 |
| 2006/0289603 A1 | 12/2006 | Zettler et al. .................. 228/2.1 |

(Continued)

FOREIGN PATENT DOCUMENTS

| | | | | |
|---|---|---|---|---|
| DE | 69504998 | 4/1999 | ............. B23Q 15/00 |
| DE | 102005029881 | 12/2006 | ............. B23K 20/12 |

(Continued)

OTHER PUBLICATIONS

Machine translation of JP-2013-123745A (no date available).*

(Continued)

Primary Examiner — Kiley S Stoner
(74) Attorney, Agent, or Firm — Hayes Soloway P.C.

(57) ABSTRACT

A friction stir welding device and a friction stir welding method provide that an additional material is introduced into the gap between a rotating pin and a fixed shoulder. The pin and/or the shoulder includes a conveyor worm structure by which the additional material is transported to the workpiece.

20 Claims, 7 Drawing Sheets

(56) References Cited

U.S. PATENT DOCUMENTS

| | | | |
|---|---|---|---|
| 2007/0152015 A1* | 7/2007 | Burton | B23K 20/1255 228/2.1 |
| 2008/0296350 A1* | 12/2008 | Henneboehle | B23K 20/1245 228/112.1 |
| 2009/0120995 A1* | 5/2009 | Hallinan | B23K 20/1255 228/2.3 |
| 2012/0279441 A1 | 11/2012 | Creehan et al. | 118/76 |
| 2012/0279442 A1* | 11/2012 | Creehan | B23K 20/1225 118/76 |
| 2014/0069985 A1* | 3/2014 | Okada | B23K 20/1245 228/112.1 |
| 2014/0069986 A1* | 3/2014 | Okada | B23K 20/1265 228/112.1 |
| 2015/0231734 A1* | 8/2015 | Okada | B23K 20/123 228/2.1 |
| 2016/0074957 A1* | 3/2016 | Nishida | B23K 37/0235 228/114.5 |
| 2016/0263696 A1* | 9/2016 | Nishida | B23K 20/1255 |
| 2016/0354860 A1* | 12/2016 | Boettcher | B23K 20/1255 |
| 2017/0304934 A1* | 10/2017 | Carlson | B23K 20/1265 |
| 2017/0304935 A1* | 10/2017 | Okada | B23K 20/12 |

FOREIGN PATENT DOCUMENTS

| | | | | |
|---|---|---|---|---|
| EP | 1872893 A1 | * | 1/2008 | B23K 20/125 |
| JP | 2009142845 | | 7/2009 | B23K 20/12 |
| JP | 4872080 B2 | * | 2/2012 | |
| JP | 2013123745 A | * | 6/2013 | |
| WO | WO2014/171132 | | 10/2014 | B23K 20/12 |
| WO | WO-2014171132 A1 | * | 10/2014 | B23K 37/0235 |
| WO | WO-2015064012 A1 | * | 5/2015 | B23K 20/1255 |

OTHER PUBLICATIONS

German Office Action (with English summary) issued in application No. 10 2014 115 535.1, dated Aug. 4, 2015 (9 pgs).

International Search Report and Written Opinion with translation issued in corresponding application No. PCT/EP2015/074098, dated Mar. 9, 2016 (27 pgs).

International Preliminary Report on Patentability issued in corresponding application No. PCT/EP2015/074098, dated Apr. 25, 2017 (10 pgs).

\* cited by examiner

FRICTION STIR WELDING TOOL AND FRICTION STIR WELDING METHOD

FIELD OF THE INVENTION

The invention relates to a friction stir welding tool and to a friction stir welding method.

BACKGROUND

In friction stir welding, a rotating tool having a disk-shaped or cylindrical shoulder and a pin projecting axially from the shoulder is displaced transversally to its rotating axis along the workpiece consisting of one or two parts, the rotating pin penetrating into the workpiece. The rotation of the pin on and within the workpiece leads to a temperature increase and to a softening of the workpiece, wherein it is also known to stir the materials of the workplaces together in the solid state. Different methods and different friction stir welding tools are known. In the conventional friction stir welding in which two adjacent metal sheets having a gap there between are stir-welded together, a concave weld seam is produced via the set angle and the diameter of the rotating shoulder. The shoulder is for example a cylindrical rotating part the end face facing the workpiece of which serves as a workplace contact surface. In this case, the shoulder rotates together with the pin. Due to the gap between the two workpiece parts, filling material is missing upon welding such that in case of wide gaps, shriek holes and thus weaker weld seams may be produced. In an initially two-part workpiece for example, the pin which projects with respect to the workpiece contact surface is displaced along the gap between the workpieces and penetrates in both parts.

In addition to tools in which the pin and the shoulder rotate together, there also exist tools having non-rotating shoulders which have lower process forces than friction stir welding tools having a rotating shoulder. Due to the planar rest of the non-rotating shoulder on the workpiece surface, a seam surface of very high quality without the ripples typical of friction stir welding is produced. The fatigue properties of the connection are thus considerably improved, and the weld seam may be painted without further preliminary works so as to have the same qualify as a relied metal sheet. The ability to bridge the gap is however highly reduced by the plane rest of the non-rotating shoulder. To date, this requires high efforts concerning the seam preparation. The tolerances of the assembly parts have to be chosen very close. Furthermore, in these tools having an upright shoulder, material of the workpieces penetrates into the annular gap between the pin and the shoulder. A regular cleaning of the tool is then necessary to avoid a sticking of the pin and the shoulder. The term "non-rotating shoulder" of course does not exclude that the shoulder is rotated upon alignment of the tool or upon displacement along a curved path. The shoulder however does not relate interminably in one direction of rotation to make quite a lot of revolutions, rather, it rotates only about some angular degrees.

A further disadvantage arising from a too small volume of material is the generation of so-called worm holes or shrink holes. Worm holes or shrink holes can be produced in case of a missing material volume in the initial configuration by large gaps or in case of a one-part workplace by already existing shrink holes. Shrink holes or worm holes may further be formed in the region of the weld seam if material leaves the region of the weld seam by the temperature-related softening and plastic deformation of the material adjoining the weld seam. In the prior art, these drawbacks are to be eliminated by concepts which provide a supply of additional material, i.e. of material from outside of the workplace. Concerning this, there exist the following fundamental ideas.

A first idea provides a so-called hollow spindle having an integrally connected pin and a shoulder through which a channel is formed via which the additional material is supplied. An example thereof is document U.S. Pat. No. 6,543,871 B2. The problems here are the risk of a plugging of the supply channel between the pin and the spindle for the additional material and the provision of sufficient pressure for the material to be supplied since a considerable counterpressure is built up in the region of the workplace during friction welding.

An improvement of this method provides that a conveyor worm having a small diameter extends through the channel and thus through the shoulder and the pin and thus softens the additional material. This method is shown in documents US 2012 0279441 A1 and US 2012 079442 A1. A very fine and powdery additional material is required therefor to not overload the filigree worm.

A further method provides the application of a granular material onto the workpiece which is passed over by the shoulder and thus deformed and plasticized. Aluminum powder can be used here as granular material. The control of the sufficient quantity of granular material and the sufficient inclusion thereof in the already present material is however difficult in case of large set angles, there is furthermore the risk that the granular material is ejected from the so-called inlet gap.

A third concept provides the placement of a separate workpiece into the gap between the two parts that are to be welded together and the closure of the gap. This concept however requires the exact definition of the gap and the insertion of a workpiece having an appropriate cross-section. To realize this, the gap is brought to size in a previous work operation by a machining process, and a wire having a rectangular cross-section then for example inserted into the gap.

Finally, a consumable pin is also known which is axially shiftable with respect to the shoulder, itself also softened upon rotational motion and then also fills the gap itself. However, since the pin is softened itself with the process heat, the welding depth which can be obtained therewith is restricted. The welding length is limited by the volume of the consumable pin, and a very complex feed system is necessary to continuously feed the pin further axially during the welding process. Such a method is known from document US 2005 0045635 A1.

The object of the invention is to present a friction stir welding tool and a friction stir welding method ensuring an improved ability of bridging a gap and guaranteeing a high welding quality. According to one embodiment of the invention, the possibility is to be created to fill the end hole typical of friction stir welding in a simple manner during the process. The end hole is generated in that the tool is pulled out of the workpiece at the end of the weld seam and no material is available to close the volume occupied by the pin.

SUMMARY

The present invention provides a friction stir welding tool comprising a non-rotating shoulder having a first workpiece contest surface for contacting a workpiece to be welded, and at least one rotating pin, the pin and the shoulder delimiting therebetween a gap, and the wall of the pin and/or of the shoulder which delimits the gap having a first axially acting conveyor worm structure, and a material supply opening being provided which is spaced apart from the first workpiece contact surface and leads into the gap.

The friction stir welding tool according to the invention works with a non-rotating shoulder, only the pin rotates. In the ring gap between the pin and the shoulder, supplied material is transported to the workpiece contact surface. However, to produce the required high pressure here, the conveyor worm structure is provided which transports the additional material to the workpiece and stirs it due to the rotation of the pin.

The friction stir welding tool according to the invention is thus realized more robust, simpler and more efficient than the tools known in the prior art. In contrast to document US 2012 0279441 A1, no rotating extruder screw is provided in the pin, rather, the pin itself which defines the gap to the shoulder transports the additional material. When the envelope surface of the pin, i.e., the wall formed by the pin comprises the conveyor worm structure, the pin acts like an extruder screw. It is however the other way around also possible that the opening in the shoulder through which the pin extends comprises the conveyor structure on the inside. The pin then ensures that the material is caused to move and is axially conveyed purposefully to the workpiece by the conveyor structure in the shoulder.

In case non liquid additional material is introduced into the gap, the material is highly sheared in the gap between the shoulder and the rotating pin. The additional material is thus brought to a temperature which reaches or exceeds the high temperature limit of elasticity of the additional material. This leads to a reduction of the force for moving the additional material in the axial direction in the gap to a minimum.

The tool according to the invention and the method which will be described below are in particular provided for welding light metals together or light metals with steel or steel alloys. Primarily aluminum and the alloys thereof are used here, plastic material being however also adapted to be welded together.

The pin preferably projects axially with respect to the workplace contact surface to plunge into the workpiece.

Optionally, the conveyor worm structure can be provided on the pin in the region of the shoulder or even further at the end of the pin projecting into the workpiece.

In the simplest case, the material supply opening may be the axial end of the gap which is opposite the workpiece. Furthermore, the material supply opening can however for example also be configured in the shoulder and lead laterally into the gap.

If solid material for example in the form of a wire is supplied, the pin may have a cutting edge in the region of the material supply opening to divide the material before it is further conveyed.

The supplied material may be a solid material, in particular a wire or a granular material. It is however furthermore also possible to supply a pasty or liquid material to the gap. The material should be softened or should be compressed and softened when it is in the form of a granular material or should at least have reached the high-temperature limit of elasticity before leaving the gap.

The supply of wire can for example be configured in a similar way to MAG welding devices in which the wire is guided between two rollers of which at least one is driven.

The shoulder and/or the pin may be shiftable with respect to each other in the axial direction of the pin, in particular by means of an actuator such that the exceeding length of the pin with respect to the shoulder is actively adjustable, more specifically irrespective of the force of the shoulder onto the component. Alternatively or additionally, the shoulder can be prestressed axially in the direction of the workpiece and can be spring-mounted.

The additional material may generally be introduced into the gap in the axial, radial, tangential or in any direction. The filling level of the gap and of the extruder-like tool resulting from the conveyor worm structure may be influenced by the quantity of supplied material. In case additional material is supplied without limitation to the tool, the latter develops a maximum volume flow of supplied material and an appropriate pressure in accordance with the speed.

The friction stir welding tool according to the invention is particularly well suited to avoid end holes, because the material is still conveyed during the extraction of the pin out of the workpiece. In this context, the shoulder may be prestressed axially in the workpiece direction and be mounted in a compressing manner. If necessary, axial stops are also provided to limit the axial spring travel. Due to this springy mounting, it is ensured that the shoulder still rests on the workpiece surface upon extraction of the pin and a flat ending of the weld seam can be realized without remaining end hole.

The friction stir welding tool according to the invention may also be used to weld a corner connection, for example a T joint. To this end, the workpiece contact surface of the shoulder comprises portions which are inclined with respect to each other and which extend substantially or entirely parallel to the surfaces of the two parts of the later workpiece. Furthermore, a rounded transition may of course be present between these two portions.

The workpiece contact surface of the shoulder may have portions for deposition welding which are arranged axially offset with respect to each other. These portions which are offset with respect to each other and are connected via a kind of step ensure that material softened at the higher portion is present, more specifically material which is present due to the softening of the workpiece as a result of the penetrating pin, and the additional material supplied to the gap. A deposition welding may thus be carried out which may for example be used for rapid prototyping.

For the connection of the layers applied on top of each other, the rotating pin penetrates into the lower layer, while the upper layer is produced.

In deposition welding, to apply very thin layers, it is also possible to reduce the aforementioned step in the shoulder to zero, and the pin merely projects slightly from the workpiece contact surface, wherein it is also possible that it is flush therewith or may even remain behind the shoulder, the layer arranged therebelow being then not contacted by the pin in the last case. The advantage of a non-stepped shoulder consists in that the tool need not be rotated when changing the welding direction. The portion located closer to the tip of the pin is namely otherwise that portion which extends in welding direction, and the portion arranged at a larger distance and thus the portion having the larger distance to the workplace contact surface is the tracking portion at which the softened material escapes.

To reduce the process forces and to increase the welding speed, the workpiece to be manufactured may be produced in a room which can be tempered. The works are carried out in a heated chamber. It is particularly favourable if the temperature of the chamber is slightly below the recrystallization temperature of the workpiece to avoid secondary recrystallization or abnormal grain growth.

As already mentioned, the pin may be axially shiftable with respect to the shoulder, or vice versa, in particular to permit the withdrawal of the pin or to be able to realize variable penetration depths of the pin.

It must be pointed out that it is not only possible to provide one single pin in a tool, but also several adjacent pins which all of partially present the conveyor worm structure or in which the conveyor worm structure is realized opposite thereto in the wall of the shoulder.

The tool according to the invention may also be configured as a so-called double shoulder tool. A non-rotating or rotating second shoulder having for its part a second workpiece contact surface is then arranged opposite the non-rotating first shoulder. The first and the second workpiece contact surfaces are arranged opposite each other, and the workpiece is located between these surfaces. A support force for the workplace during welding can be realized due to the second shoulder.

The pin may be a common pin which also projects into the second shoulder. It is optionally of course also possible to provide a separate pin for the second shoulder. In both cases a second gap is formed between the second shoulder and the associated pin or pin portion which can also be filled with additional material and by means of which the material is conveyed to the workpiece. The appropriate structures on the pin and/or on the second shoulder are configured such that they lead to a conveying of the additional material in opposite direction to the conveying direction on the first shoulder.

The distance between the two shoulders can also be varied, as a result of which the pressing force of the shoulders may be varied. The second shoulder may optionally also be provided with a torque support to avoid its rotation therewith.

The first or also the second shoulder, alternatively also both shoulders and/or the pin may be produced from a material having a poor thermal conductivity such as ceramics to not lead the process heat out of the workpiece. A particularly homogenous temperature field is thus produced in the workpiece.

The tool can be heated or tempered, and the tempering can for example be carried out by convection of a heated liquid (e.g. oil, such as silicone oil) or by resistive heating, inductive heating, heating generated by friction or by the combustion of fuels. If the shoulder is made of a non-magnetic material such as ceramics, the inductive heating by embedding a coil into the shoulder can be advantageous. Due to the additional energy supply, it is possible to increase the maximum feed rate while simultaneously reducing the process forces. It is optionally possible to use diamagnetic, paramagnetic or ferromagnetic materials in the tool to intensify or concentrate the magnetic field for the infective heating.

However, it is furthermore also possible to heat the pin.

To reduce the force for displacing the tool in feed direction and to minimize the static friction between the shoulder and the workpiece, it is possible to move the shoulder, for example to reciprocally rotate the latter in an oscillating manner minimally about few angular degrees or to apply ultrasound. The friction and the process forces are therefore reduced.

The supplied material may be the same material as that of one or both workpieces to be connected or a different material, for example an alloy having a higher or lower solidity than the material of one of the two ports to be welded together forming the workpiece.

With the tool according to the invention, it is also possible to weld different materials together, for example light metal such aluminum with steel in this case, it can be advantageous to move the pin mostly in the low-melting material and, if necessary, to additionally supply a low-melting or the low-melting material.

It is also possible to weld plastic materials and other materials together using the tool according to the invention.

If several pins are used, the arrangement of the pins may be configured such that conveyor worm structures are provided on the envelope surfaces of the pins like a double screw-type extruder. This permits to additionally increase the gap width which has to be bridged, as well as the flow rate of material to be supplied.

Irrespective of the number of pins it is also conceivable to arrange a pre-conveyor worm upstream of the conveyor worm formed by the pin and the shoulder, which then produces part of the process pressure such that the material to be supplied is already guided into the gap between the pin and the shoulder at a certain pressure and is precompressed.

The non-rotating shoulder may contain a reservoir for the supplied additional material or the material released from the workpiece upon penetration of the pin. This reservoir is delimited by an axially movable control sleeve between the shoulder and the pin in a region spaced from the first workpiece contact surface. The control sleeve is axially adjustable and can act upon the pressure contained in the reservoir with a determined force and can press it out of the reservoir. The supply of material can thus be controlled or even regulated.

During the penetration process of the tool pin into the workpiece, it may be advantageous if the pin rotates contrary to the normal direction of rotation. Material displaced by the pin is thus conveyed into the reservoir, and the escaping of material below the tool shoulder is avoided.

A kind of wear compensation of the pin may furthermore also be present, because wear is produced on the rotating pin due to the abrasive effect on the tool. The quality of the weld seam is affected in case of a considerable change of the length, the diameter or the shape of the pin. Due to an axial displacement of the pin and/or a withdrawal movement of the shoulder, an unconsumed portion of the pin can be moved into the region of the shoulder or into the workpiece.

The pin may furthermore also be post-processed, more specifically in the tool-installed or machine-installed state. The rotational motion of the pin can be used to move it in a grinding means. The relative motion between the pin and the corresponding cutting edge in the grinding or cutting means (e.g. a turning tool) carried out by the machine axis is used for shaping.

By means of the tool according to the invention, it is also possible to weld lap connections together, i.e. two overlapping workplaces. It is then possible to process material combinations having highly different melting temperatures for the two workpiece parts. The harder higher-melting material is usually located below and at a larger distance to the shoulder.

The tool can comprise a control or regulation unit which in particularly controls the lateral feed rate of the tool (laterally to the longitudinal axis of the pin), the speed of the pin and/or the quantity of supplied material. This control or regulation is carried out as a function of at least one of the following parameters:

the torque of the pin,
the feed force to be applied for the tool,
the pressure force of the shoulder,
the temperature of the shoulder, the pin and/or the supplied material, and/or
the required force for supplying wire as supplied material.

These control or regulation concepts serve to prevent an insufficient supply of additional material to exclude the formation of pores. A supply of too much material may however lead to an undesired seam elevation or to a lateral extrusion of material on the workpiece or to the lifting of the tool off the workpiece.

The simplest possibility of a regulation is the so-called direct regulation. Here, the cross-section of the gap in the workpiece is determined in the run of the seam using a measuring method (e.g. a laser scanner). The missing seam volume and the material volume to be supplied are calculated therefrom. The exact required material quantity is supplied via the supply unit for the material.

In addition to the just mentioned direct regulation, there is the possibility of an indirect regulation or detection of a lack of material.

In case the pin is not entirely surrounded by material, the torque is reduced. The torque however increases with an increasing filling level of the formed conveyor worm. The feed force of the tool furthermore changes if the pin is not completely surrounded by material. The axial force onto the pin and the shoulder also depends on whether the pin is entirely surrounded by material. If the torque and/or the feed rate and/or the axial force of the tool (pin and/or shoulder) or a characteristic number calculated, among others, from these parameters leaves a predetermined value, additional material is supplied to a greater extant to avoid the formation of pores.

The regulation can be carried out both in a discrete or in a continuous manner. A discrete regulation means here the activation of a constant supply rate. A continuous regulation means however that the quantity of the supplied material, i.e. the volume flow of supplied material is a function of the deviation of the actual value from the set value.

Known regulation concepts may be used for regulation, such as PID controllers, multiple controllers, fuzzy controller or similar.

Since the heating and the conveying of material can cause a temporal delay, it is possible to regulate the speed of the pin to increase the conveying capacity and the feed rate in addition to the regulation of the supply rate. Shrink holes present in the material may also be detected and eliminated using this regulation concept.

The tool according to the invention may also be used to repair workpieces, for example to close cracks, shank holes or pores in engine blocks.

The tool is very well adapted to be used for welding on hollow profiles in which local deformations of the hollow profile and thus the formation of wormholes may occur very easily. The non-rotating shoulder on the tool ensures low process forces, and the additional material prevents the generation of wormholes.

The invention furthermore relates to a friction stir welding tool having an integrated pin postprocessing unit having a machining cutting tool (e.g. a grinding tool or a cutting edge) against which the pin can be moved to machine the latter. This tool-integrated pin postprocessing unit is not limited to the fact that the friction stir welding tool has a material supply but is also adapted to be used in any friction stir welding tool.

The cutting tool can be non-rotating but merely adapted to be fed laterally by means of an actuator, which is not to be interpreted in a limiting manner. The rotary motion in machining is carried out by the rotation of the pin. An axial motion of the pin can be realized by an actuator which shifts the pin axially.

The invention is furthermore achieved by a method of friction stir welding in which an additional material is introduced into a gap between a non-rotating shoulder which contacts the workpiece with a first workpiece contact surface and a rotating pin and is transported to the workpiece.

The pin preferably plunges into the workpiece to heat and plasticize the latter.

The additional material introduced into the gap is softened in the tool before reaching the workpiece and, if necessary, is previously also compressed if it is to be supplied to the gap in a non-liquid form.

A solid material such as wire or a granular material, a pasty or liquid material can be supplied to the gap as supplied material.

The method according to the invention is used to close a defective spot in an already existing workpiece, for example a shrink hole or a crack in an engine block, to weld a two-part workplace, in particular in butt welding, joint welding or lap welding, to weld a corner connection and/or for deposition welding.

It is further provided that additional material is furthermore conveyed to the workpiece at the end of the welding process upon withdrawal of the pin out of the workpiece during the rotation of the pin. The weld seam is thus realized without any end hole.

The method according to the invention can for example comprise the following individual steps when the tool has reached the end of the weld seam:

a) stopping of the feed with a simultaneous rotation of the pin and a simultaneous conveying of additional material into the gap, b) slow withdrawal of the pin with a simultaneous maintenance of the position of the shoulder while simultaneously additionally conveying the material out of the gap, c) stopping of the supply of additional material out of the gap as soon as the pin has reached the workpiece surface, and d) common withdrawal of the pin and the shoulder from the workpiece surface.

The method according to the invention further provides a control or regulation in that the feed rate of the tool, in particular the lateral feed rate thereof, the speed of the pin and/or the quantity of material supplied to the workpiece is regulated such that the weld seam is not deepened with respect to the portion of the workpiece contact surface of the shoulder opposite the feed direction. The weld seam is preferably not elevated, either, with the exception of deposition welding. Alternatively or additionally, the regulation is configured such that no shrink holes or cavities occur.

The components influencing the control are the components already mentioned above such as the torque of the pin, the force to be applied in food direction for softening, the feed rate for the tool, the pressure force of the shoulder, the temperature of the shoulder, the pin and/or the supplied material and/or the required force for supplying wire as supplied material.

It must be pointed out that the features mentioned above in connection with the tool can also be applied to the method according to the invention.

DETAILED DESCRIPTION

Figure 1:
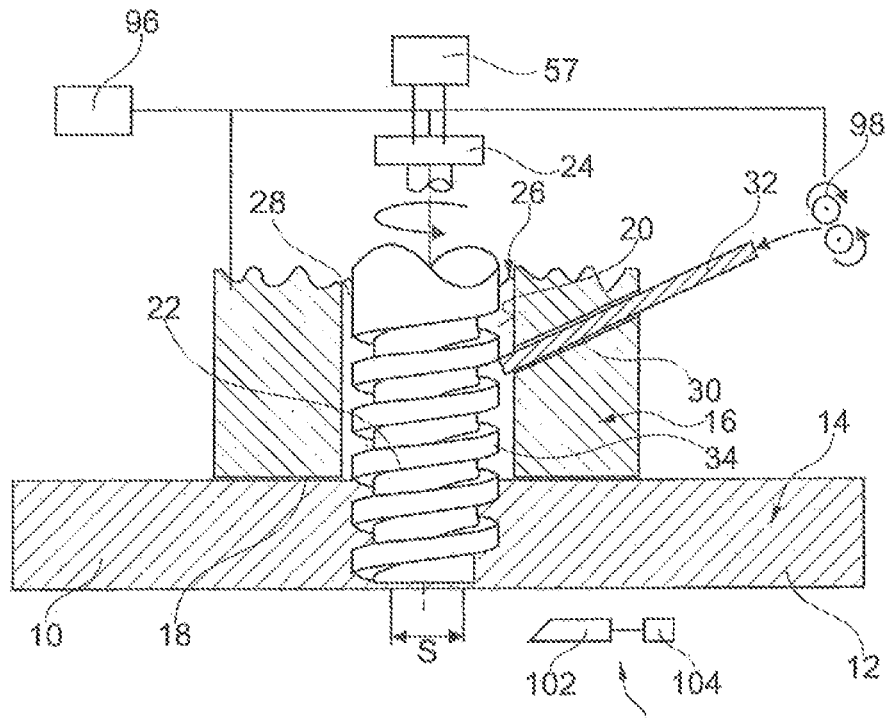
FIG. 1 a schematic view in longitudinal section through an embodiment of the friction stir welding tool according to the invention in the region of the tip of the pin, FIG. 2 a view in longitudinal section through a variant of the friction stir welding tool according to the invention, FIG. 3 the friction stir welding tool according to the invention applied in a hollow profile, FIGS. 4a to 4d consecutive steps upon withdrawal of the pin at the end of the friction stir welding method according to the invention, FIG. 5 a schematic view in longitudinal section through a further embodiment of the friction stir welding tool according to the invention, FIG. 6 a variant of the friction stir welding tool according to the invention upon welding of a corner connection, FIG. 7 a schematic sectional view through the friction stir welding tool according to the invention in accordance with a variant in the region of the material supply opening, FIG. 8 a view in longitudinal section through a further variant of the friction stir welding tool according to the invention which is used for deposition welding, FIG. 9 a bottom view of the tip of the pin and the shoulder of the friction stir welding tool of FIG. 8, FIG. 10 a schematic top view onto the friction stir welding tool of FIG. 8 and the workpiece upon friction stir welding, FIG. 11 a view in longitudinal section through a variant of the friction stir welding tool according to the invention having a heating system, FIG. 12 a schematic view in longitudinal section through a friction stir welding tool according to the invention having a double shoulder, FIG. 13 a schematic view in longitudinal section through a friction stir welding tool according to the invention having a variable reservoir of additional material, FIG. 14 a view in longitudinal section through the friction stir welding tool of FIG. 13 according to a variant, and FIG. 15 a view in longitudinal section through the friction stir welding tools according to the invention upon welding of a lap connection.

FIG. 1 illustrates a friction stir welding tool by means of which a workpiece 14 initially composed of two parts 10, 12 is welding together.

In the present case, the parts 10, 12 configured as metal sheets are arranged side by side spaced apart from each other with a regular or non-regular gap S.

The friction stir welding tool comprises a so-called shoulder 16 which is for example a circular cylindrical part. The end face facing the workpiece 14 which in this concrete case is configured in a plane manner, forms a first workpiece contact surface 18 via which the shoulder 16 rests on the upper side of the workplace 14 upon welding.

A preferably cylindrical opening 20 in the shoulder 16, which is not to be interpreted in a limiting manner, serves to receive a pin 22. This pin 22 is set into a rotary motion by an engine 24. The shoulder 16 does not rotate and is configured as a fixed shoulder.

A gap 28 is formed between the wall 26 of the shoulder 16 delimiting the opening 20 and the exterior side, more specifically the envelope surface of the pin 22.

This ring gap 28 has the purpose that the pin 22 does not rub against the shoulder 16. The gap 28 is however used for the supply of material and the processing of material since the gap S between the parts 10 and 12 has to be filled with material to avoid a deepened seam.

To this end, the shoulder 16 comprises one or several material supply openings 30 which extend laterally in an oblique manner in the present case.

Additional material 32, here in the form of a solid material such as wire or granular material is supplied to the gap 28 via this material supply opening 30. As an alternative to a wire, it is also possible to supply a granular material as material, or also a pasty or liquid material.

An axially acting conveyor worm structure 34 ensures the transport of the additional material 32 to the workpiece 14. This conveyor worm structure 34 is provided by an appropriate structures of one or both of the wall(s) which delimit the gap 38, i.e. the envelope surface of the pin 22 and/or the wall 26 of the shoulder 16.

In the example embodiment of FIG. 1, the pin 22 is provided with the conveyor worm structure 34 on the envelope side. The conveyor worm structure 34 extends from the region of the shoulder 16 up to the free end of the pin 22 and thus into the workpiece 14.

As can be seen in FIG. 1, the conveyor worm structure 34 need not necessarily be present at the upper end of the gap 28 to be able to here realize a sealing possibility more easily.

As can be seen in FIG. 1, the pin 22 penetrates into the workpiece 14, i.e. it is heated by the friction of the edges of the parts 10, 12 occurring upon rotation so as to be able to plunge therein on the side of the edges. Due to the rotation, the materials ore stirred such that an intermaterial bond is generated. This method may also be applied to parts 10, 12 having different materials, for example light metals such as aluminum on the one hand and steel on the other hand. However, in this case, the pin 22 will mainly plunge into the softer material and heat the latter.

If the workpiece 14 consists of parts 10, 12 of different materials, it may be advantageous to use the material of the softer part of the two parts 10, 12 as additional material 32.

The additionally supplied material 32 is sheared in the gap 26 and highly heated by the shearing and flexing process and transported to and into the workpiece 14 via the conveyor worm structure 34.

The additional material 32 preferably reaches the workpiece 14 in a softened, for example pasty state, which is not to be interpreted in a limiting manner.

Due to the conveyor worm structure, pressure is generated in the workpiece 14 for the material of the workplace 14 softened upon stirring in such an amount that the material softened upon stirring does not penetrate into the gap 28. The shoulder 16 may rest on the workpiece surface in a plane manner or can be slightly angled.

The delivery rate of supplied material 32 can be controlled or regulated by varying the speed of the pin 22 and of the supplied material 32 and the geometry of the conveyor worm structure 34.

The tracking portion of the shoulder 16 planishes the top side of the weld seam and of the workpiece such that the two parts 10, 12 can be well connected to each other so that so step and not depression is formed on the workpiece surface and the latter can be painted without further processing.

The alignment of the material supply opening 30 may be arbitrary. It must not necessarily lead laterally into the gap 28; rather, it can also open into the gap from the top.

Figure 7:
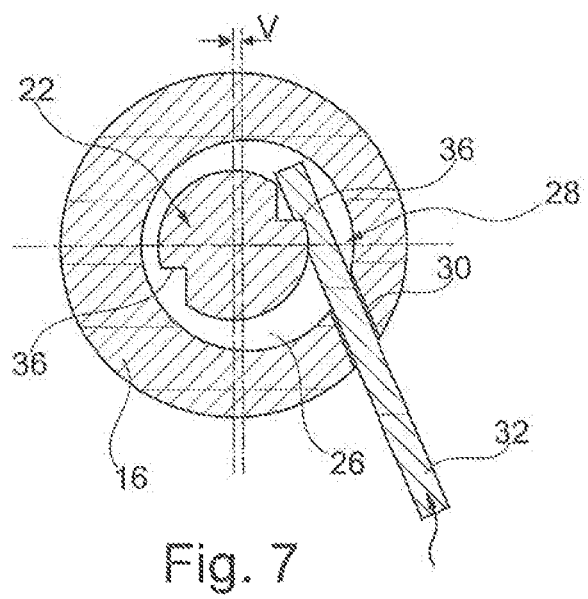

In the embodiment illustrated in FIG. 7, one or more culling edges 36 are formed or fastened to the pin 22 on the axial height of the outlet of the material supply opening 32 which cut the supplied wire in the gap 28 in single parts.

FIG. 7 also shows irrespective of the cutting edges 36 that a radial offset V may be present between the rotary axis of the pin 22 and the center axis of the (in this case circular cylindrical) opening 26 in the shoulder 16. This results in a gap 28 having radially differing widths and which in the region of the outlet of the material supply opening 30 is larger than on another side. This counteracts a plugging of the wire supply opening 30. The material is scraped from the pin at the narrowest point.

Figure 2:
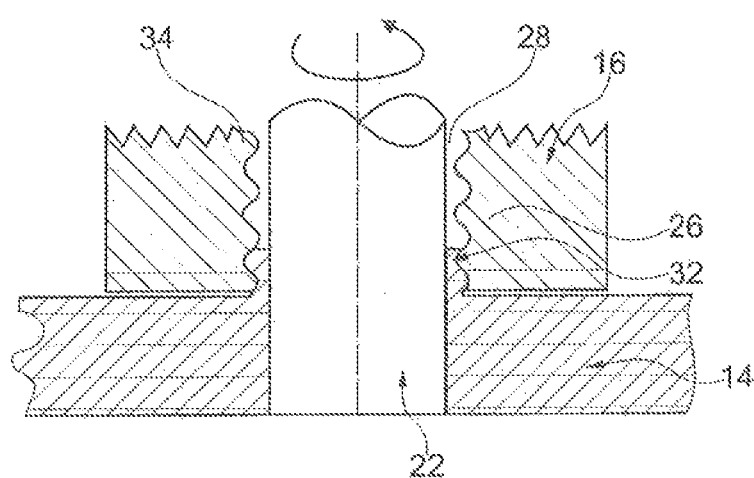

As already mentioned above, the conveyor worm structure 34 can alternatively or additionally also be configured on the wall 26 of the shoulder 16. This is shown in FIG. 2. Here, the shoulder 16 is also non-rotating. In this case, the pin 22 is furthermore configured in a circular cylindrical manner and has no conveyor worm structure. Due to the friction on the surface of the pin 22, the latter however moves the supplied material 32 in the gap 28 such that it is also displaced in the axial direction towards the workpiece 14 by the stationary conveyor worm structure 34.

Alternatively, a combination of the conveyor worm structures 34 in FIG. 1 and FIG. 2 on the pin 22 and on the shoulder 16 may be present.

In the embodiment of FIG. 2, the supplied material 32 is also introduced into the gap 28 via a material supply opening 30, the material supply opening 30 being adapted to be configured like in FIG. 1 also in this case.

Figure 3:
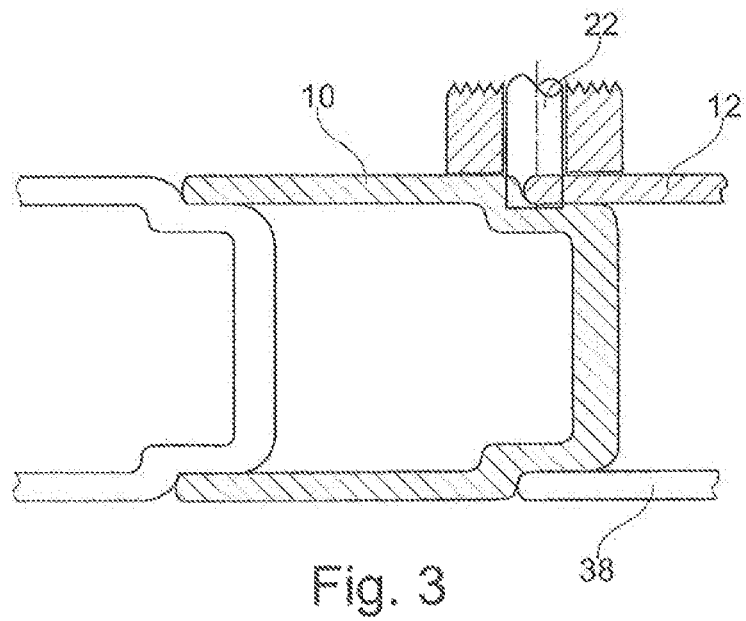

FIG. 3 shows a possible use of the tool according to the invention, in which a part 12 in the form of a metal sheet is welded to an open hollow profile forming the part 10. The open hollow profile 10 is relatively instable and is supported in the axial direction by a counter support 38. The pin 22 penetrates laterally into the parts 10, 12 and can even possibly project axially through the part 12 and further deeper into the part 10. Using the friction stir welding tool, it is possible to reduce the process forces upon welding in comparison with the prior art, and the missing material volume is compensated due to the use of the supplied material 32. The low process forces permit the use of filigree profiles in the region of the web of the hollow profile.

To avoid end holes which can be produced upon withdrawal of the pin 22 at the end of the weld seam in the workpiece 14, the invention provides a tracking of the material supply during the extraction of the pin. This is explained in FIGS. 4a to 4d.

Figure 4A:
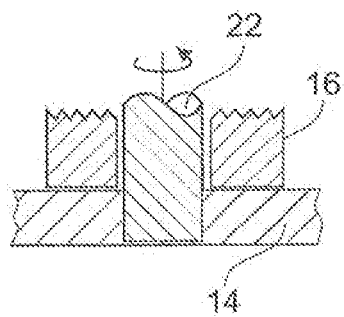

In FIG. 4a, the pin 22 still rotates in the workpiece 14 and has reached its final position in feed direction.

Figure 4B:
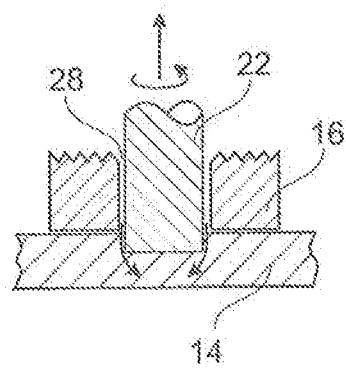
Figure 4C:
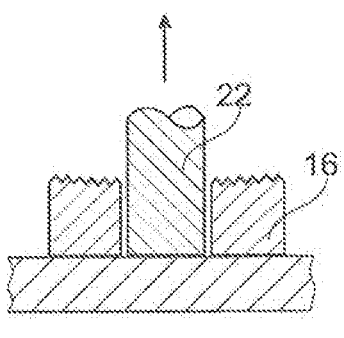
Figure 4D:
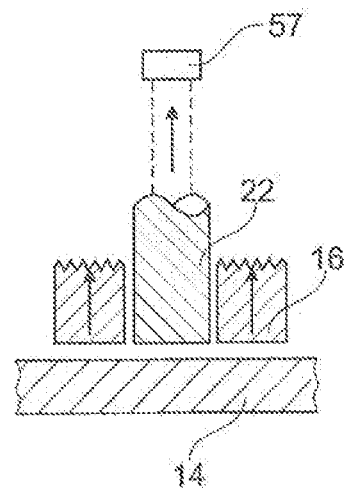

Upon further rotation of the pin, the latter is pulled axially out of the already welded workpiece 14 (FIG. 4b). In this state, additional material is however still transported to the workpiece 14, as indicated by the arrows in FIG. 4b. The volume of the pin 22 is thus compensated. When it reaches the workpiece surface, the pin 22 can be stopped, see FIG. 4c. The pin 22 and the shoulder 16 are then jointly pulled axially away from the workpiece 14, see FIG. 4d.

To configure the tool as simple as possible and to permit a method such as in FIGS. 4a to 4d, a parallel guiding may be present along the rotation axis between the shoulder 16 and the non-rotating past of a machine spindle which guides the shoulder 16 in an axially shiftable manner.

By way of alternative, the pin 22 itself may be axially displaced or the shoulder 16 may be moved relative to the pin 22 by means of an actuator 57.

Figure 5:
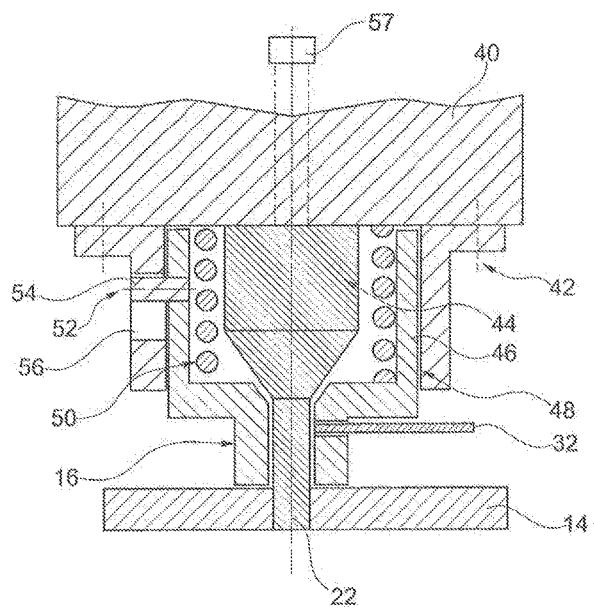

A very simple variation of the tool is shown in FIG. 5. The fixed part 40 of the drive engine 24 or of a tool spindle is illustrated here, to which a mounting part 42, here a sleeve having a collar, for example, is screwed. A rotating spindle 44 merges into the pin 22. The mounting part 42 serves as an axial bearing for the shoulder 16 which has a sleeve-shaped portion 46 surrounding the spindle 44. A gap 48 may be formed between the sleeve-shaped portion 46 and the mounting part 42. If necessary, a friction bearing or a coating can here ensure a low friction.

A spring element 50 ensures an axial prestress of the shoulder 16 in a direction towards the workpiece 14.

To limit the axial sliding range of the spring-mounted shoulder 16, a stop 52 is provided which acts in two axial directions and comprises a pin 54 which is fastened to the shoulder 16 and projects into an elongated hole 56 in the mounting pad 42.

In this embodiment of the tool, the tool can generally be axially pulled away from the workpiece 14 when it reaches its final position and when the pin 22 is pulled out. However, since the shoulder 16 presses against the workpiece 14 in a compressed state, see FIG. 5 in the normal welding operation, the shoulder 16 rebounds upon withdrawal of the tool and still remains in contact with the workplace 14.

The shoulder 16 and/or the pin 22 may be shifted relative to each other in the direction of the pin 22 via the actuator 57 such that the length of the pin 22 projecting from the shoulder 16 can be adjusted actively, more specifically irrespective of the force of the shoulder 16 on the component. The shoulder 16 may alternatively or additionally be prestressed axially in the workpiece direction and can be mounted in a compressed manner.

The embodiment according to FIG. 5 is furthermore very well suited for the welding of parts 10, 12 having locally different thicknesses such that the shoulder 16 compresses and rebounds upon travelling along the surface of the part(s) 10, 12.

Figure 6:
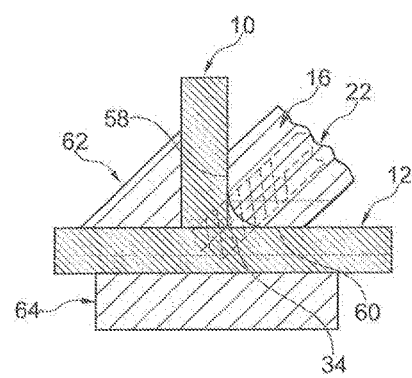

A further vacant of the friction stir welding tool and a further variant of its applicability are shown in FIG. 6. Here, the pads 10, 12 are configured as corner connection, for example as a T joint of flat metal sheets. In the present friction stir welding methods, wormholes can very easily be produced here.

The shoulder 16 of the tool according to the invention comprises a first contact surface having a portion 58 and a portion 60 which hath preferably extend parallel to the part 10 or the part 20 and are therefore inclined which respect to each other. The transition between the portions 58, 60 may be configured as a curved portion to generate a uniform hollow weld. In the present case, the pin 22 is also configured with a conveyor worm structure 34 and penetrates in both parts 10, 12 in the region of their joint, as can be seen in FIG. 6 to weld them together. An additional material is also supplied here like in the remaining embodiments.

Counter supports 62, 64 may also be provided for supporting the parts 10, 12.

Figure 8:
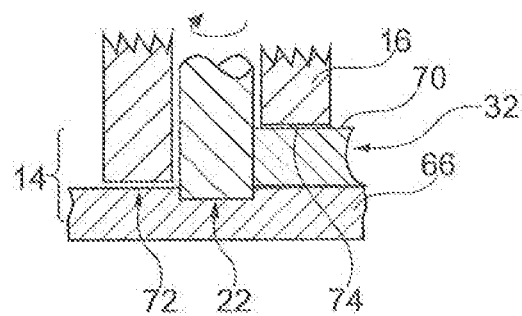
Figure 9:
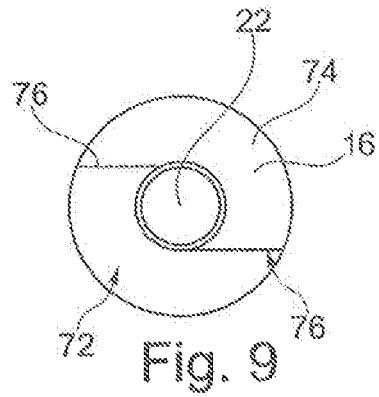
Figure 10:
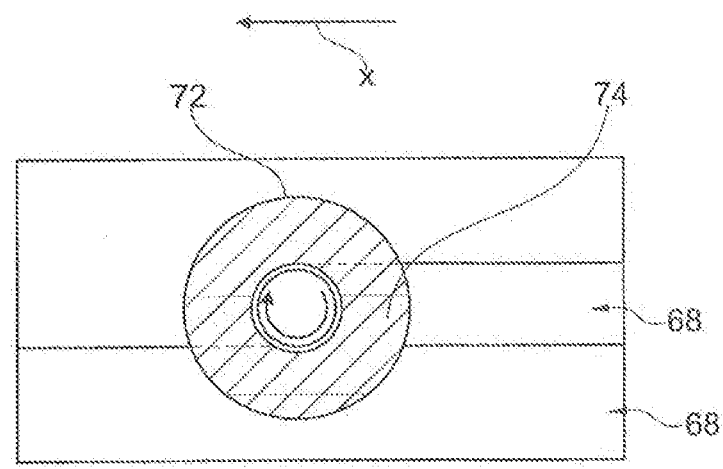

The new method may also be used for deposition welding, for example using the tool according to FIGS. 8 and 9. The pin 22, which is not obligatorily the case, can penetrate to a minimum into a lower layer 66 of the produced workplace 14, and additional material 32 in the form of a trace 68 is simultaneously deposited. To this end, the shoulder 16 is not flush with a first workpiece contact surface 18 located in a plane. Rather, it has a lateral outlet in the region of that end which is located opposite the feed direction X such that the softened, for example pasty material can exit as a trace 68 via an lateral outlet 70. Here, a variant consists in that two portions 72, 74 of the workpiece contact surface 16 are arranged axially offset with respect to each other, the two portions 72, 74 being separated from each other by two steps 76 which extend in feed direction X and are parallel to each other. As can be seen in FIG. 10, the portion 74 arranged further away from the workpiece surface rests on a previously produced parallel trace 68 and on the adjacent trace 68 which is just to be produced. The pin 22 can also penetrate into the previously produced trace 68 upon rotation to again softened and plasticize the latter. The deepened portion 72 rests on the lower layer 66 and delimits the trace 68 just being produced laterally to the feed direction X (see FIG. 10).

Figure 11:
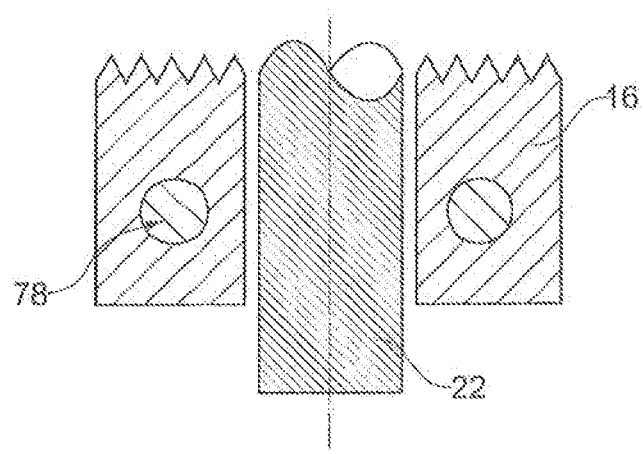

By tempering the tool, in particular the shoulder 16, it is possible to avoid a clogging of the pin 22 and the shoulder 16 by cooled material. By increasing the temperature, it is however also possible the make the additional material 32 softer or at least to pre-heat the latter. To this end, a heating system 78, see FIG. 11, is for example integrated into the shoulder 16. The shoulder 16 can then include a channel through which heated oil flows. Alternatively, it is also possible to integrate a heating system, for example an inductive heating means into the shoulder 16. The shoulder 16 is for example made of ceramics, which is advantageous for an inductive heating by means of introduced coils. To increase the concentration of the magnetic field, it is optionally possible to use diamagnetic, paramagnetic or ferromagnetic materials in the tool, for example in the pin 22 or in the shoulder 16 or in the region of the support of the parts 10, 12.

Figure 12:
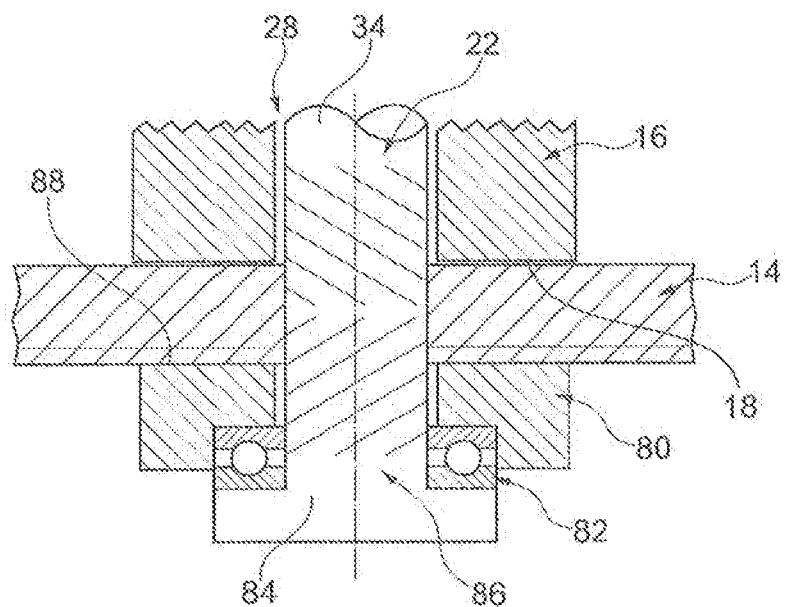

FIG. 12 shows a friction stir welding tool having a so-called double shoulder. In addition to the shoulder 16 which constitutes a first shoulder, a second shoulder 80 is used which comes to rest on the face of the workpiece 14 which is opposite the shoulder 16 and contacts the workpiece 14 and thus acts as an counter-support. The shoulder 80 can rotate or can also be stationary as in the example embodiment of FIG. 12 in which the shoulder 80 rests on the widened end 84 of the continuous pin 22 via a pivot bearing 82.

The pin 22 preferably comprises a first conveyor worm structure 34 in the region of the shoulder 16, which is not to be interpreted in a limiting manner, the structure being configured such that the supplied material 32 is transported to the workpiece 14. However, the pin 22 furthermore includes an opposite second conveyor worm structure 86 in the region of the shoulder 80 which in turn is oriented such that the material is also conveyed in a direction towards the workpiece 14 upon rotation of the pin 22.

The conveyor worm structures 34, 86 may extend up to the interior of the workpiece 14 and directly adjoin each other. Additional material 32 is thus preferably also supplied in the region of the shoulder 80, which is not to be understood in a limiting manner.

In this embodiment, the workpiece 14 rests on the first workpiece contact surface 18 of the first shoulder 16 and the oppositely aligned second workpiece contact surface 88 of the second shoulder 80.

Figure 13:
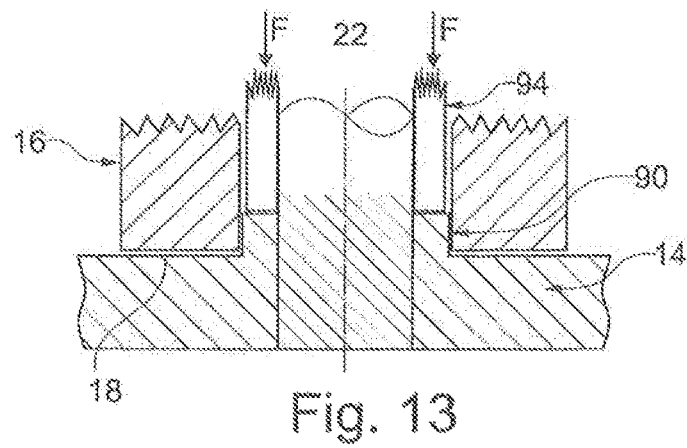
Figure 14:
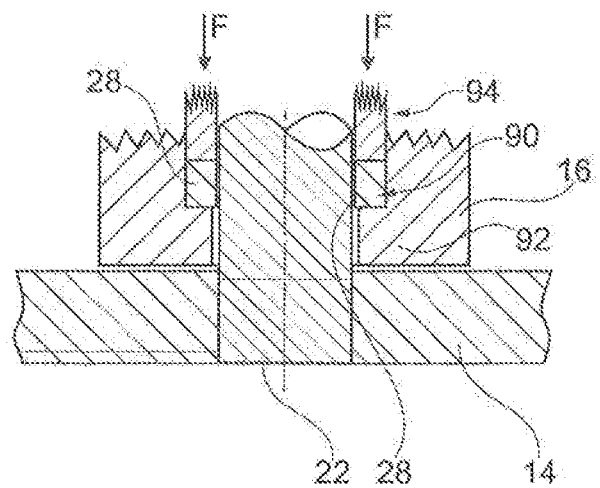

The non-rotating shoulder 16 (alternatively of course also additionally the shoulder 80) can include a reservoir 90 in the form of an extra wide portion of the gap 28. This is illustrated in FIGS. 13 and 14. It is possible to temporarily store supplied additional material 32 or to receive released material upon penetration of the pin 22 into the workpiece 14 in this reservoir 90.

In the embodiment according to FIG. 13, the reservoir 90 is open towards the workpiece 14 without any constriction, whereas in the embodiment according FIG. 14, a constriction 92 is additionally present in the shoulder such that the reservoir 90 is in fluidic communication with the workpiece 14 only via the narrow part of the gap 28.

A control sleeve 94 forms the axial upper wall portion which delimits the reservoir 90 at least essentially axially upwards. The control sleeve 94 is adapted to be axially shifted in a controlled or regulated manner to change the volume of the reservoir 90, i.e. if necessary to receive or suck material or to press material out.

Figure 15:
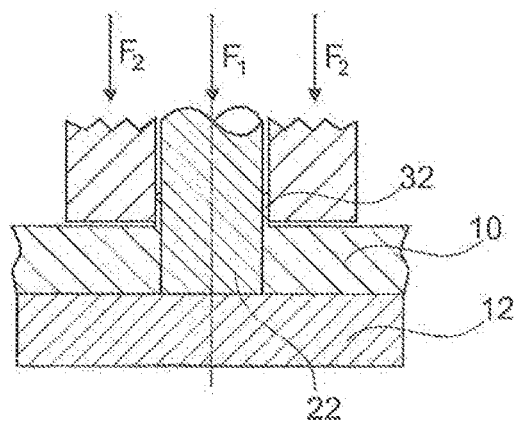

FIG. 15 shows a lap connection having a first softer part 10 and a harder part 12 arranged therebelow, for example the pair aluminum and steel. The pin 22 preferably slightly penetrates into the lower part 12 and extends through the part 10. Additional material 32 is also supplied in the present case. Incidentally, this of course also applies to the embodiment according to all previous figures in which the workpiece supply opening 30 is partially not represented in an explicit manner.

It is true for all embodiments that they can be combined with other embodiments and the features of these embodiments as mentioned above. This is for example the case for the shape of the shoulder, the heating means, the reservoir and also for the double shoulder as well as for the conveyor worm structure 34 which can be provided on the pin 22 and/or on the shoulders) 16, 80. As also already explained above, the supplied material 32 can be composed of the same material as one of the parts 10, 12 or also have a higher or lower solidity than one of the parts 10, 12.

The number of pins 22 per tool is not limited, it is possible to realize several pins side by side like a double screw-type extruder. It is thus possible to increase the ability of bridging the gap as well the delivery rate.

Irrespective of the embodiment or the combinations thereof, the tool may be provided with a control/regulation unit 96 which is represented only as an example in FIG. 1. This unit 96 ensures a perfect welding process without the formation of pores, for example by determining the cross-section of the missing material in the gap between the pads 10, 12 using a laser scanner and by calculating the missing weld volume. The supplied quantity of material 32 is accurately controlled or regulated via a supply unit 98, in the specific example using two or at least one driven roller for the conveyance of wire.

The lateral feed rate of the tool, the speed of the pin 22 and/or the quantity of supplied material 32 is controlled or regulated as a function of at least one of the following parameters via the unit 96:

torque of the pin 22,
feed force to be applied for the tool,
pressure force of the shoulder 16 in the axial direction,
temperature of the shoulder 16, of the pin 22 and/or of the supplied material 32, and/or
the required force for supplying wire as supplied material 32.

Furthermore, a direct or indirect regulation can be carried out, for example via the torque and/or the feed force and/or the axial force of the tool from which it is possible to draw conclusions as to necessity of changing the material supply. This has already been explained above in the present introductory part of the specification to which reference is made.

The friction stir welding tool can comprise a pin postprocessing unit 100 (see FIG. 1), having a machining cutting tool 102 (for example a grinding means or a cutting edge) which can be moved laterally against the pin 22 to machine the latter in a chip-forming manner. The cutting tool 102 may be non-rotating and merely be fed laterally by means of an actuator 104. The rotary motion in machining is carried out by the rotation of the pin 22. An axial motion of the pin 22 can be realized by the actuator 57. The friction stir welding tool thus has an integrated pin postprocessing unit 100, and it is no longer necessary to dismount the pin 22 when it has first signs of wear. A tool-integrated pin postprocessing unit 100 is not limited to the fact that the friction stir welding tool has a material supply. Rather, it can be used in any friction stir welding tool.

Finally, it can also be mentioned that the shoulder 16 or both shoulders 16, 18 can be caused to make an oscillating movement so as to reduce the friction on the workpiece 14.

The tool and the method are in particular provided for the welding of light metals together or of light metals with steel or with steel alloys. Particularly aluminum and the alloys thereof are used therefor.

The invention claimed is:

1. A friction stir welding tool, comprising
a non-rotating shoulder having a front side facing a workpiece comprising a first workpiece contact surface for contacting the workpiece to be welded, and
at least one rotating pin,
a gap delimited between the pin and the shoulder, and the wall of the pin and/or of the shoulder which delimits the gap having a first axially acting conveyor worm structure, and the friction stir welding tool having a material supply opening which is spaced apart from the first workpiece contact surface and leads and opens into the gap distanced and above from the front side so that material added via the material supply opening is conveyed to the workpiece by the first conveyer worm structure.

2. The friction stir welding tool according to claim 1, wherein the at least one pin is configured as a conveyor worm at its outer envelope.

3. The friction stir welding tool according to claim 1, wherein the shoulder has a lateral material supply opening.

4. A friction stir welding tool, comprising
a non-rotating shoulder having a front side facing a workpiece comprising a first workpiece contact surface for contacting the workpiece to be welded, and
at least one rotating pin, a gap delimited between the pin and the shoulder, and the wall of the pin and/or of the shoulder which delimits the gap having a first axially acting conveyor worm structure, and the friction stir welding tool having a material supply opening which is spaced apart from the first workpiece contact surface and leads and opens into the gap distanced and above from the front side, wherein in the region of the material supply opening, the pin includes a cutting edge in addition to the worm structure for cutting the supplied material.

5. The friction stir welding tool according to claim 1, wherein the supplied material is a solid material.

6. The friction stir welding tool according to claim 1, wherein at least one of the shoulder and the pin are shiftable with respect to each other in the axial direction of the pin and/or wherein the shoulder is prestressed axially towards the workpiece and is spring-mounted.

7. The friction stir welding tool according to claim 1, wherein the first workpiece contact surface of the shoulder has portions which are inclined with respect to each other for welding corner connections, or portions which are axially offset with respect to each other for deposition welding.

8. The friction stir welding tool according to claim 1, wherein the pin is axially shiftable with respect to the shoulder or the shoulder relative to the pin.

9. The friction stir welding tool according to claim 1, wherein a second shoulder having a second workpiece contact surface opposite the first workpiece contact surface of the first shoulder, the workpiece being located between the two workpiece contact surfaces.

10. The friction stir welding tool according to claim 9, wherein at least one of the pin and the second shoulder comprises a second axial conveyor worm structure which has an axial conveying direction opposite the first conveyor worm structure.

11. The friction stir welding tool according to claim 1, wherein the tool includes a heater.

12. The friction stir welding tool according to claim 1, wherein the gap has an axial length, and wherein an axially movable, non-rotable control sleeve is provided between the shoulder and the pin in a region spaced from the first workpiece contact surface, which at least partially delimits the gap axially and makes the axial length thereof variable.

13. The friction stir welding tool according to claim 1, wherein a control/regulating unit is provided which controls or regulates the feed rate, the speed of the pin and/or the quantity of supplied material as a function of at least one of the following parameters:
torque of the pin,
feed force to be applied for the tool,
pressure force of the shoulder in the axial direction,
temperature of the shoulder, the pin and/or the supplied material and/or
the required force for supplying wire as supplied material.

14. A friction stir welding method, wherein comprising the following steps:
providing a friction stir welding tool having a non-rotating shoulder with a front side facing a workpiece, the front side having a first workpiece contact surface for contacting the workpiece to be welded, and at least one rotating pin, and a gap delimited between the pin and the shoulder, and
introducing an additional material into the gap between a non-rotating shoulder contacting the workpiece with the first workpiece contact surface and the rotating pin, the shoulder having a front side facing the workpiece, the additional material being introduced into the gap above the front side and distanced therefrom and being transported to the workpiece.

15. The method according to claim 14, wherein the additional supplied material is softened before reaching the workpiece.

16. The method according to claim 14, wherein the method is used to close a defective spot in a workpiece, to weld a two-part workpiece by joint or lap welding, to weld a corner connection or for deposition welding.

17. The method according to claim 14, wherein additional material is still conveyed to the workpiece at the end of the welding process upon pulling the pin axially out of the workpiece during rotation of the pin.

18. The method according to claim 14, wherein the lateral feed rate of the tool, the speed of the pin and/or a quantity of supplied additional material are regulated such that a weld seam is not deepened with respect to the portion of the workpiece contact surface of the shoulder which is opposite a feed direction of the tool and/or has no cavities or shrink holes.

19. The method according to claim 14, wherein the shoulder is caused to oscillate.

20. The method according to claim 14 comprising the following steps:
determining the cross-section in the gap in the workpiece in the run of the seam using a laser scanner,
determining and calculating missing seam volume and material volume to be supplied, and
supplying the exactly required additional material quantity.

* * * * *